(12) United States Patent
Sternberg

(10) Patent No.: US 10,653,153 B2
(45) Date of Patent: May 19, 2020

(54) SCOOPED OUT BAGEL PRODUCT, APPARATUS AND METHOD OF MAKING SCOOPED OUT BAGEL

(71) Applicant: Dennis G. Sternberg, Allenhurst, NJ (US)

(72) Inventor: Dennis G. Sternberg, Allenhurst, NJ (US)

( * ) Notice: Subject to any disclaimer, the term of this patent is extended or adjusted under 35 U.S.C. 154(b) by 0 days.

(21) Appl. No.: 15/559,999

(22) PCT Filed: Apr. 27, 2017

(86) PCT No.: PCT/US2017/029911
§ 371 (c)(1),
(2) Date: Sep. 20, 2017

(87) PCT Pub. No.: WO2017/189886
PCT Pub. Date: Nov. 2, 2017

(65) Prior Publication Data
US 2018/0177203 A1    Jun. 28, 2018

Related U.S. Application Data

(60) Provisional application No. 62/328,254, filed on Apr. 27, 2016.

(51) Int. Cl.
*A21D 13/40* (2017.01)
*A21D 8/06* (2006.01)
(Continued)

(52) U.S. Cl.
CPC .............. *A21D 13/40* (2017.01); *A21B 3/132* (2013.01); *A21B 3/137* (2013.01); *A21B 5/00* (2013.01);
(Continued)

(58) Field of Classification Search
CPC ....... A21B 3/13–139; A21B 5/08; A21B 5/00; A21B 5/02; A21B 5/023; A21B 5/026;
(Continued)

(56) References Cited

U.S. PATENT DOCUMENTS 2,570,374 A * 10/1951 Pompa ................ A47J 37/1295
99/416
3,963,402 A *  6/1976 Berta ..................... A21C 9/088
425/299
(Continued)

OTHER PUBLICATIONS

International Search Report & Written Opinion issued in PCT/US 2017/029911 dated Aug. 31, 2017.

*Primary Examiner* — Tu B Hoang
*Assistant Examiner* — Erin E McGrath
(74) *Attorney, Agent, or Firm* — Scully Scott Murphy & Presser

(57) ABSTRACT

A scooped out bagel dough product, bagel mold halves, and an apparatus using the bagel mold halves for making a scooped out bagel product. The scooped out bagel product is a baked bagel product half having: a crunchy blistered outer shell with a substantially reduced amount of doughy inner chamber that provides its unique flavor. This scooped out bagel product utilizes a predesigned custom mold that creates stalactites, i.e., flavor spikes, and holes or flavor "pit" formations that each encapsulate the soft doughy inner contents within a boiled and baked blister shell and increases a surface area of dough on an inner surface thereof. The product is a "scooped out" half bagel crunchy on its outer surface but filled with the flavor spikes, and flavor pits in which substantially reduced amounts of dough are encased relative to a comparable sized whole bagel.

18 Claims, 13 Drawing Sheets

(51) Int. Cl.
   *A21B 5/00* (2006.01)
   *A21B 3/13* (2006.01)
   *A21B 5/02* (2006.01)
   *A21C 9/08* (2006.01)
   *A21C 11/16* (2006.01)
(52) U.S. Cl.
   CPC ............... *A21B 5/02* (2013.01); *A21C 9/083* (2013.01); *A21C 11/166* (2013.01); *A21D 8/06* (2013.01)
(58) Field of Classification Search
   CPC ....... A21C 9/083; A21C 13/40; A21C 11/002; A21C 11/166; A21C 11/004; A21C 11/006; A21D 13/32; A21D 13/33; A21D 13/40; A21D 13/44; A21D 13/47; A21D 13/48
   USPC ............................................. 99/426; D7/359
   See application file for complete search history.

(56) References Cited

U.S. PATENT DOCUMENTS

| | | | |
|---|---|---|---|
| 4,168,334 A * | 9/1979 | Crandall | A21B 3/133 220/573.1 |
| 5,033,193 A | 7/1991 | Valenti | |
| 5,226,352 A * | 7/1993 | Savage | A21B 3/13 249/144 |
| 5,351,608 A * | 10/1994 | Muchin | A21B 3/15 99/422 |
| 5,514,395 A | 5/1996 | Burger | |
| 5,557,998 A | 9/1996 | Schwartz et al. | |
| 5,641,527 A | 6/1997 | Burger | |
| 5,897,900 A | 4/1999 | Groulx et al. | |
| 5,948,313 A * | 9/1999 | Cahen | A21B 3/13 249/160 |
| 5,948,456 A * | 9/1999 | Jones | A23G 1/207 426/100 |
| 6,165,527 A * | 12/2000 | Wilk | A21C 11/002 426/138 |
| 7,458,163 B2 | 12/2008 | Teich et al. | |
| 7,481,645 B2 * | 1/2009 | Helou, Jr. | A21B 3/13 425/210 |
| 7,879,380 B1 * | 2/2011 | Radatti | A21B 5/08 426/439 |
| 2002/0146494 A1 * | 10/2002 | Wilk | A21C 11/002 426/279 |
| 2007/0184161 A1 | 8/2007 | McDonnell et al. | |
| 2010/0047431 A1 | 2/2010 | Toufayan | |
| 2012/0201927 A1 | 8/2012 | Meikle | |

* cited by examiner

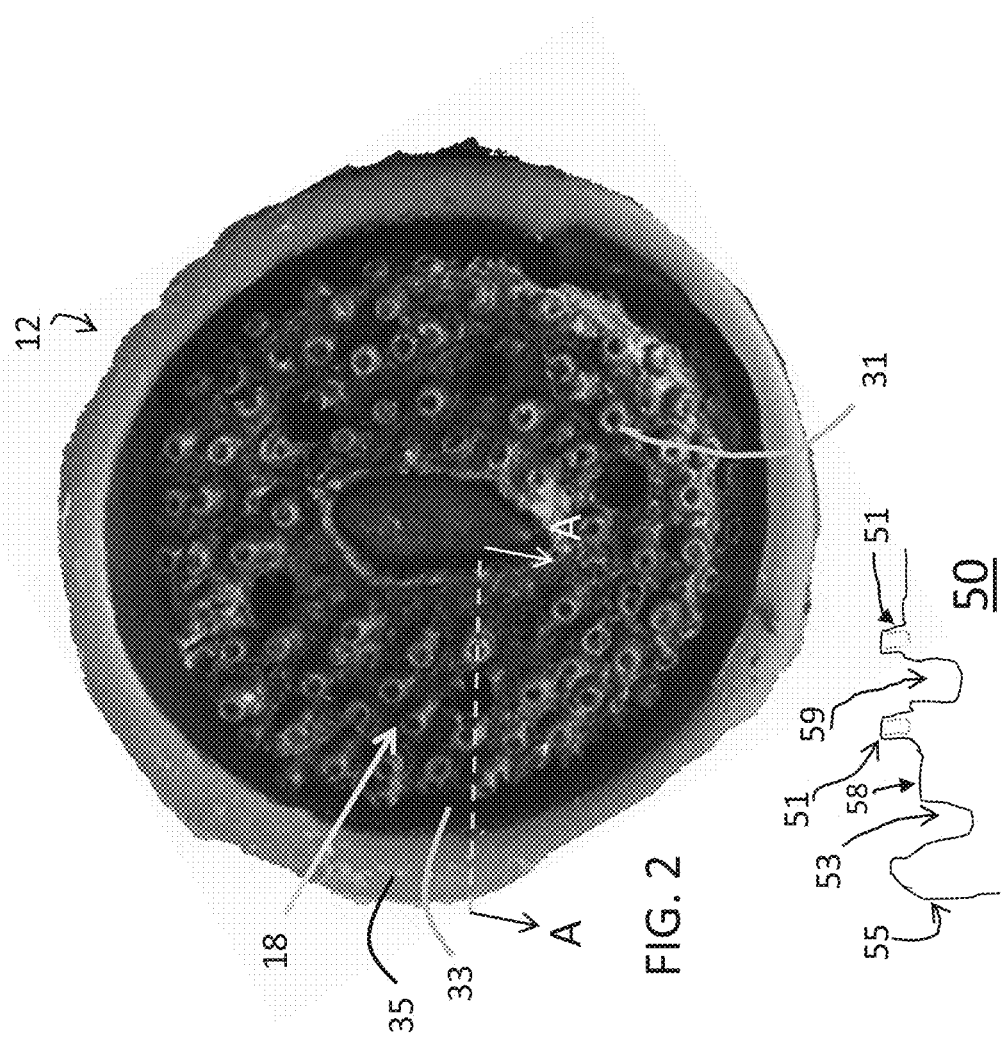
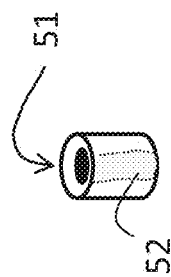
FIG. 2
FIG. 2A
FIG. 2B

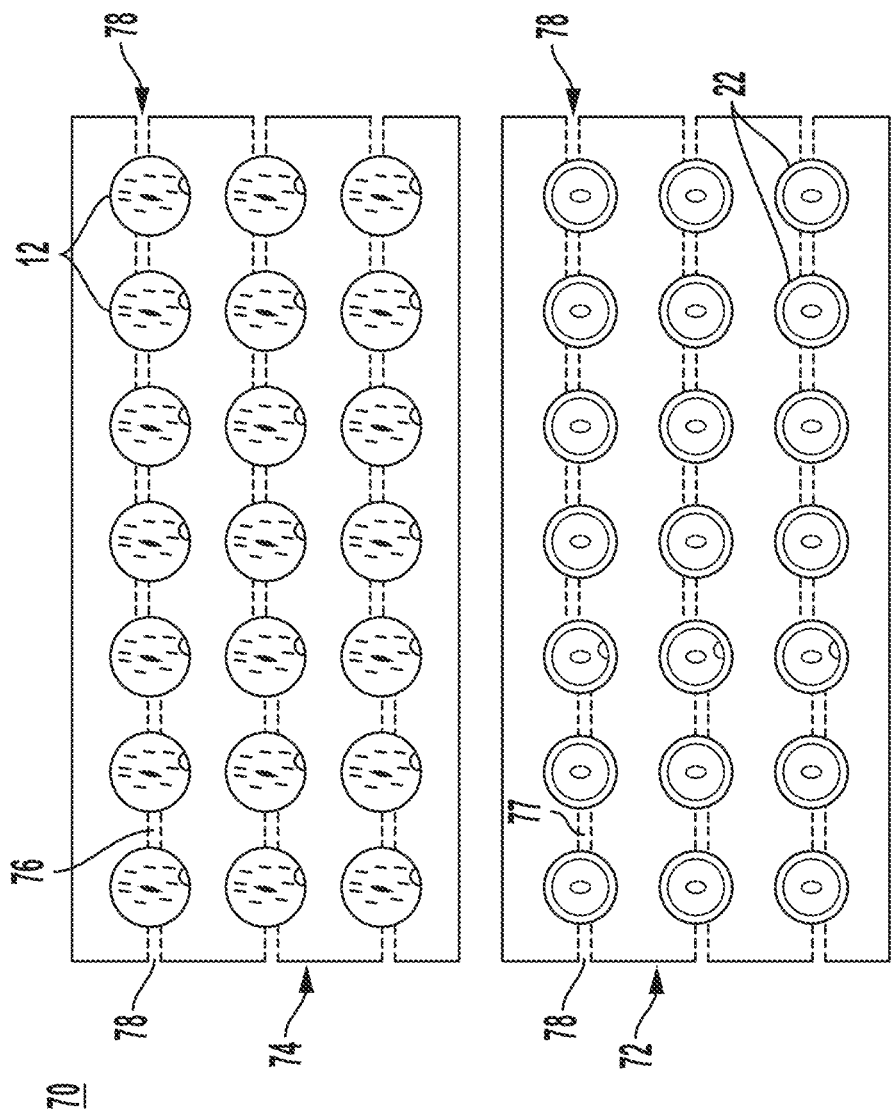

SCOOPED OUT BAGEL PRODUCT, APPARATUS AND METHOD OF MAKING SCOOPED OUT BAGEL

RELATED APPLICATIONS

The present application is a '371 of PCT Application US2017/029911, filed on Apr. 27, 2017, which claims priority of U.S. patent application having U.S. Ser. No. 62/328,254, filed on Apr. 27, 2016.

FIELD OF THE DISCLOSURE

The present disclosure generally relates to edible bagel products and particularly, a scooped out bagel product, a novel mold for making scooped out bagel products, and a system and method of making a scooped out bagel products.

BACKGROUND

The unique flavor and shape of a bagel has become a favorite staple of many breakfast tables as well as a method to deliver a cornucopia of spreads and sandwich stuffers. Bagels have become ubiquitous food products found in bakeries, or packaged and sold in stores. However, observation of methods of bagel consumption reveals the end consumer is not satisfied with multiple aspects of the bagel. Many users, when creating their own bagel sandwich, first slice the bagel. This is awkward and difficult for some users. Some people find the slicing of a bagel with a knife a possible source of injury from accidental cuts with the knife. Even if the bagel is pre-sliced, e.g., cut in half, many consumers are still not happy.

Further, consumers who are calorie conscious deem consumption of the massive inner portion of the bagel a recipe for adding unwanted pounds to their bodies. That is, calorie conscious consumers of bagels are unhappy with the voluminous doughy center contents of the bagel. Consumers of bagel products are oftentimes observed to use their fingers to pull, scrape and seemingly disembowel the dough from the bagel. Some try to use utensils such as a fork, spoon or even a knife to remove and then discard the doughy internal portion of their bagel. If purchased at a breakfast or lunch establishment they may request the proprietor to do this work for them.

It would be highly desirable to provide a ready-made "scooped out" baked bagel product that maintains the taste of a bagel and yet wholly caters to the needs of calorie conscious consumers, avoids the effort of modifying the whole bagel product and avoids the waste of unwanted edible food product and the discarding of the pulled, picked unwanted doughy content.

BRIEF SUMMARY

An apparatus and method for providing a scooped bagel product half are described. The apparatus includes a novel bagel mold design and provides a method of using the mold to produce scooped out bagel products that are released from the mold and subsequently oven baked. Alternately, the bagel product may be baked while still within the mold and subsequently released for a final finish in the oven. The bagel mold design and scooped out bagel product half resulting from use of the mold preserve the taste and the crunchiness of the outer bagel shell but leaves only enough soft doughy inside to provide the texture without the over-abundance of spongy dough.

Thus, in one aspect, there is provided a mold for making a bagel product half comprising:

a first unitary bagel mold half having a recessed portion therein shaped for receiving a dough material used to make a bagel product, and a second unitary bagel mold half having a complementary protruding portion adapted for placement within said recess portion of said first unitary bagel mold half such that a space is defined between the recessed portion and protruding portion, the defined space configured to receive a predefined amount of bagel dough material;

said first unitary bagel mold half and second unitary bagel mold half adapted for sealed engagement for compressing said predefined amount of dough material within said defined space, wherein a surface of said recessed portion, a surface of said protruding portion, or both said surfaces of said mold half recessed portion and said mold half protruding portion include a plurality of holes, depressions, and one or more projecting crater formations having a hollow interior.

In a further aspect, there is provided a method of making a hollowed bagel product comprising:

inserting a dough material into a first unitary bagel mold half having a recessed portion therein shaped for receiving a dough material used to make a bagel product; and engaging a second unitary bagel mold half with the first unitary bagel mold half to form a sealed assembly, the second unitary bagel mold half having a complementary protruding portion adapted for placement within the recessed portion of the first bagel mold half such that, when engaged, the dough material takes a shape in a space defined by surfaces of the recessed portion and protruding portion, wherein an inner surface of the recessed portion, a surface of the protruding portion, or both surfaces of the recessed portion and the protruding portion include a plurality of holes, depressions, and one or more projecting crater formations having a hollow interior;

supplying a flow of boiling water to the defined space having the dough material hollow shaped therein;

boiling the hollow shaped dough material while in the engaged mold halves for a pre-determined amount of time;

releasing the water after boiling the hollow shaped dough material from the defined space; and baking the boiled hollowed shape dough material for a pre-determined amount of time to form the hollowed bagel product.

In one embodiment, the baking of said boiled hollowed shape dough material occurs while engaged within said first and second unitary bagel mold halves. After the baking within the mold, the mold is released to complete the bake.

In a further aspect, there is provided a method of making a hollowed bagel product comprising:

placing a dough material into a first unitary bagel mold half having a recessed portion therein shaped for receiving a dough material used to make a bagel product; and engaging a second unitary bagel mold half with the first unitary bagel mold half to form a sealed assembly, the second unitary bagel mold half having a complementary protruding portion adapted for placement within the recessed portion of the first bagel mold half such that, when engaged, the dough material takes a shape in a space defined by surfaces of the recessed portion and complementary protruding portion, wherein a surface of the recessed portion, a surface of the complementary protruding portion, or both surfaces of the recessed portion and the complementary protruding portion include a plurality of holes, depressions, and one or more projecting crater formations having a hollow interior;

supplying a flow of boiling water to the defined space having the dough material hollow shaped therein;

boiling the hollow shaped dough material while in the engaged mold halves for a pre-determined amount of time;

releasing the water after boiling the hollow shaped dough material from the defined space;

baking the boiled hollowed shape dough material for a pre-determined amount of time to form the hollowed bagel product; and separating the first and second unitary bagel mold halves from engagement.

In one embodiment, the boiled hollowed bagel product is baked in the sealed mold for a pre-determined amount of time in the oven. After separating the bagel mold halves from engagement, a brief final bake is conducted to create a final outer surface glaze.

In a further aspect, there is provided a system of making a hollowed bagel product comprising:

a bagel product half mold assembly comprising:

a first tray having a plurality of female bagel mold halves, each of the plurality of female bagel mold halves having a recessed portion therein shaped for receiving a dough material used to make a bagel product, and a second tray having a plurality of male bagel mold halves, each of the plurality of male bagel mold halves configured for alignment with a corresponding female bagel mold half, the male bagel mold halves each having a complementary protruding portion adapted for placement within the recessed portion of a corresponding aligned female bagel mold half such that a space is defined between the surfaces of the recessed portion and protruding portion, an extruder device for automatically measuring and obtaining a precise amount of raw dough material product for insertion into each of the plurality of female bagel mold halves of the first tray;

means for engaging first and second trays to form a sealed mold assembly in which the plurality of male bagel mold halves of the second tray is aligned for sealed engagement with a corresponding female bagel mold half of the first tray, each protruding portion of a corresponding male bagel mold halves placed within the recessed portion of the female bagel mold half such that, when engaged, the extruded dough material takes a hollowed shape in the defined space, wherein a surface of the recessed portion, a surface of the protruding complementary portion, or both surfaces of the recessed portion and the complementary protruding portion include one or more of: a plurality of holes, depressions, and one or more projecting crater formations having a hollow interior;

a conveyance apparatus for conveyance of the engaged, sealed mold assembly to a receptacle of boiling water, wherein boiling water of the receptacle is conveyed to the defined space having the hollowed shape dough material shaped therein;

said conveyance apparatus transferring the plurality of boiled hollowed shape dough products in the assembly to an oven, and separating the first and second trays from sealed engagement to release the plurality of boiled hollowed shape dough products bagel from the assembly for baking in the oven.

In a further aspect, the conveyance apparatus transfers the plurality of boiled hollowed shape dough products within the assembly to an oven without separating the first and second trays from sealed engagement. Thus, an initial baking occurs within the sealed molds. After a proscribed time, the sealed molds are opened to release the hollow bagel product half which receives a final short bake to achieve its final outer surface glaze.

Another aspect of the present invention is the hollowed bagel product formed according to the methods described.

BRIEF DESCRIPTION OF THE SEVERAL VIEWS OF THE DRAWINGS

Other aspects, features and advantages of the present invention will become more fully apparent from the following detailed description, the appended claims, and the accompanying drawings in which similar elements are given similar reference numerals.

FIG. 2 shows the design of a male mold half 50 including a convex shaped bagel mold portion in one embodiment;

FIG. 2A shows an elevation cross-sectional view taken along line A-A of the male mold half portion of FIG. 2 showing profile features of the convex shaped bagel mold portion in one embodiment;

FIG. 2B shows a detailed view of raised hollowed crater formation 51 in one embodiment;

FIG. 6 shows a plurality of mold halves formed as mold assembly 70 for automated or semi-automated mass production of scooped out bagel products;

FIG. 7B showing steps leading to baking of the boiled bagel products in an oven.

DETAILED DESCRIPTION

Figure 1:
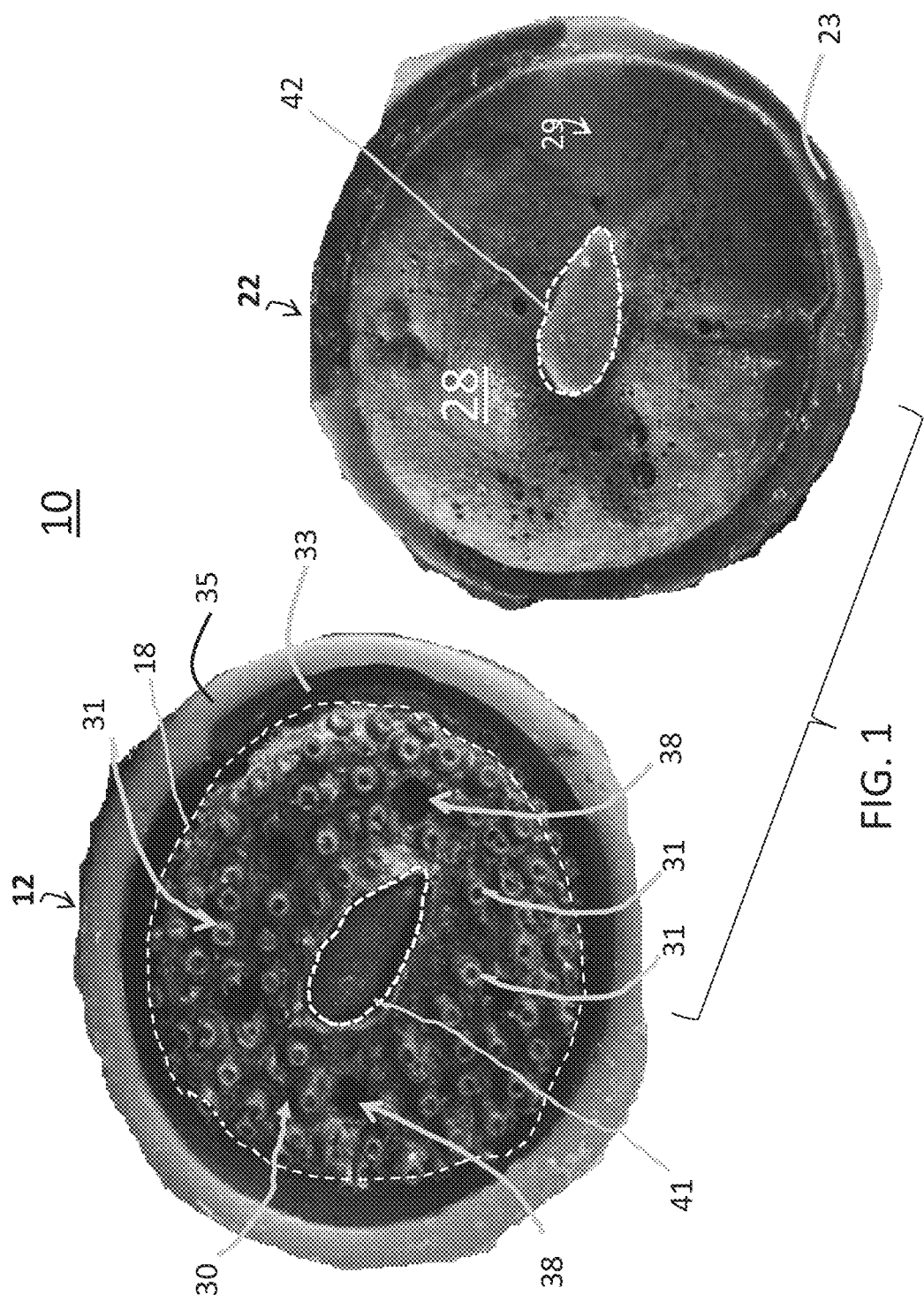
FIG. 1 depicts a scooped out bagel mold design 10 in one embodiment, for making a scooped out bagel half product according to one embodiment.

The present disclosure relates to the creation of a bagel product half that delivers all the best and most satisfying qualities of a bagel: a crunchy blistered outer shell however, with a substantially reduced amount of doughy inner chamber that provides its unique flavor.

This redesigned bagel utilizes a predesigned custom mold that creates stalactites and stalagmites (i.e., flavor spikes of plateaus and crevices) that encapsulate the soft doughy inner contents within a boiled and baked blister shell. The product is a "scooped out" half bagel crunchy on its outer surface but filled with doughy projections, e.g., flavor "spikes", plateaus and crater-like depressions or valleys (flavor "pits" defined herein below) in which substantially reduced amounts of dough are encased. The flavor and appearance equal or surpasses the gastronomical pleasure of any traditionally made hand rolled custom baked bagel.

The unique troughed (i.e., also referred to herein as being hollowed or scooped out) bagel half design also enables the consumer to top or fill the bagel more neatly and deters unwanted spillage and overflow of spreads or salads out of the bagel.

FIG. 1A shows a scooped out bagel mold design 10 in one embodiment, for making a bagel product delivering the elements of familiar, visual identification, texture, flavor and gastronomic appreciation of a traditional bagel. The mold 10 includes an inner mold half 12 and a corresponding outer mold half 22. Each mold half (12, 22) may be a heat resistant acrylic or ceramic material or even a metal or alloy material (e.g., stainless steel). In one embodiment, each of the mold halves 12 and 22 may be of unitary construction and it may be constructed utilizing platinum silicone, a baking approved material used throughout the industry. Specifically, both male and female molds may be formed of platinum silicone which allows for a method of baking on a mass production line basis.

In a non-limiting embodiment, the mold halves (12,22) may be of such size as to produce any sized scooped out bagel product, e.g., conventional size bagel, mini-bagels, flagel. For example, a "conventional" hand-made bagel shop product is approximately 100 mm long, 90 mm wide and 50 mm high through the center hold, top and bottom. In one embodiment, the outer and inner mold halves may produce a scooped-out bagel half product that is about 25 mm high measured from the convex outside of the central hole to the height of the rim of the scooped-out bagel half product.

In one embodiment, the outer mold half 22 is a female mold half including a concave inner region 28 in the shape of a conventional bagel for receiving an amount of dough sufficient for forming a hollowed out bagel product. An inner surface 29 of concave region 28 is largely smooth as it results in shaping the corresponding outer bagel product surface. The outer mold half 22 includes a raised outer lip or edge formation 23 defining the dimensions of the concave region 28.

The corresponding inner mold half 12 is a male mold half including a convex shaped or raised bagel mold portion 18 dimensioned in height and width to fit within the corresponding concave shaped inner region of the outer mold half 22, yet when in mated engagement therewith, leaving a space between the mold halves to enable a pre-defined amount of raw bagel product mold to take a shape defined therein. The inner mold half 12 includes a raised circumferential edge or lip portion 35 and defines a circumferential crevice or trough 33 surrounding the raised bagel mold portion 18 and between the raised circumferential edge or lip portion 35. The raised bagel mold portion 18 has an outer surface 30 populated with a plurality of surface area textures and raised or projecting formations 31 throughout which, when baking a bagel product therein will result in a hallowed out bagel half having inner surfaces formed with doughy stalagmite and stalactite formations. As shown in FIG. 1, each of the multiple raised or projecting formations 31 include a formed hole extending the length of the interior of the formation 31 and having a portion extending above the surface of the raised bagel mold portion 18.

FIG. 1 further shows the inner raised bagel portion 18 having a surface 30 which further includes crevice or hole or valley formations 38 and/or fissures or gaps or plateaus that will result in a scooped out half bagel product having formed inner surfaces with a doughy skin having doughy stalagmite or stalactite formations (depending upon a perspective up/down orientation of the bagel product).

In one embodiment, the convex shaped bagel mold portion 18 includes a region 41 having a raised structure in the form of a protrusion, mesa or plateau, and the corresponding concave shaped inner region 28 of the outer mold half 22 formation includes a corresponding formation 42 in the form of a protrusion, mesa or plateau, such that, when mated to form the hollowed scooped out bagel half, there will emerge in the formed hallowed out bagel half the characteristic hole in the product's middle as typically associated with a bagel product. Absent such indents, a hole does not necessarily form. In one embodiment, the formation 42 may be complementary shaped and accommodate placement of the raised structure 41 such that, when mated with the female mold half, ensures formation of the characteristic hole in the formed bagel product's middle.

In one embodiment, corresponding features may be provided on each mold half to mate inner and outer mold halves which may include a type of sealed engaging means, e.g., a press, or fastening means (not shown), or the like, for engaging them in a desired orientation for forming the scooped out half bagel product.

In an alternate embodiment, 3D printing techniques using 3D printer may be used to create the scooped out stalagmite and stalactite populated inner concave bagel portion formations and the outer convex and smooth oval shape including the emerging hole in the product's middle associated with the bagel. For example, a 3D printer can be utilized as an alternative to make additional molds using an existing mold such as shown in FIG. 1, as a template FIG. 2 shows the inner male bagel mold half 12 of FIG. 1 including edge lip 35, edge trough portion 33 and the formed raised or projecting hollowed craters 31 and holes or depressions 38 formed in the inner bagel mold have surface.

FIG. 2A shows a a detailed cross-sectional side of the inner male bagel mold half 12 taken along line A-A of FIG. 2.

The cross-sectional view depiction of the inner male bagel mold half portion 50 of FIG. 2A shows the outer mold edge or lip portion 55 corresponding to the edge or lip 35 of FIG.

2, and also depicts the formed crevice or trough portion 53 corresponding to the crevice or trough 33 that surrounds the raised bagel mold portion 18 and defines the raised edge of the formed hollowed bagel half. In the side cross sectional profile view of FIG. 2A, raised inner male bagel mold half portion 50 has a surface 58 including a plurality of raised or projecting hollowed crater formations 51 that extend above the surface 58.

The cross-sectional view depiction of the inner male bagel mold half portion 50 of FIG. 2A further shows formed holes or depressions 59 that extend below the surface 58 and that are scattered throughout the surface 58 dimensioned in depth and width to accommodate receipt of raw bagel dough.

The cross-sectional view depiction of the inner bagel mold half portion of FIG. 2A shows further detail including the height and width of raised hollowed craters 51, and the depth of holes 59 relative to the height and length of convex shaped male mold portion 50. As shown, the depth of a hole 59 may be one-half the height of the protruding portion of the male mold half, or three-quarters the height of the male mold protruding portion, or substantially the whole height of the male mold protruding portion, or any height therebetween.

FIG. 2B shows a detailed view of raised hollowed crater formation 51 that, in one embodiment, is cylindrical shaped and that includes a hollowed portion 52 of sufficient height and width dimensions to accommodate raw bagel dough input to the hollowed portion of the crater which results in complementary stalagmite shape when the raw bagel form is released from the engaged male/female mold halves. It is understood that the projecting crater formations 51 may take on a variety of shapes besides cylindrical. That is, on the inner male mold surface 58, the raised crater shapes 51 do not have to be uniformly patterned, nor be of a uniform size; Further the size, i.e., the shape and dimensions of the raised crater portions 51 may vary to result in a more natural and varied architecture as would be found in a traditional bagel that has been manually scooped out.

These raised hollowed craters 51, and holes, valleys or surface craters 59 are pronounced to result in distinct stalagmite/stalactite formations formed of dough that rise from the inner doughy surface of the formed hallowed out bagel half. There is no limitation as to the number of raised crater formations 51 or hole formations 59 formed on the surface of the male mold portion 58, nor is there any limitation as to the dimensions (e.g., length, width or depth) of any one crater 51 or hole 57. In one embodiment, the holes may be circular, oval or oblong in shape. However, in one embodiment, the holes and valleys are dimensioned so as to accommodate an amount of raw bagel dough product that takes the shape of the surface formations 51, 53, 59, on the male mold portion 50 when the scooped bagel mold halves are in pressurized engagement, such that the shaped raw bagel dough product retains its shape after boiling and baking processing steps. As shown in FIG. 2A, these formations 51, 53, 59 may be formed on anywhere on the surface 58 of male mold portion 50 and result in achieving a number of flavor spikes and resulting in an increased hollowed bagel dough inner surface area with flavor pits and stalagmites and stalactites that project above and below the surface of the internal portion using a substantially reduced amount of dough.

In one non-limiting example embodiment, the depth dimension of the hole 59 ranges between approximately 2 to 5 millimeters, the height dimension of the hole 59 ranges approximately from 3 to 6 millimeters, the diameter dimension of the hole 59 ranges between 2 to 6 millimeters, and the hole width dimension may range from between 3 to 8 millimeters wide. Additionally, the raised hollowed crater of cylinder-like shape may range in height anywhere between 2 mm-6 mm, may range in width anywhere from between 2 mm at an apex, to 5 mm-6 mm at a base and at a depth from between 2 mm-4 mm.

In addition, although not shown, the surface 58 of male mold portion 50 may include a plurality of fissures, ridges or crevices formed anywhere on the convex shaped male mold surface. These fissures or crevice formations formed in the convex shaped male mold surface are present to form corresponding inner doughy surface skin textures in the resulting formed hollowed out bagel half. The physical attributes of such fissures, trench or crevice formations such as their length, width, and depth are not limited. The ridges and crevices that also encapsulate the soft doughy inner contents also provide increased surface area and hence, result in increased bagel flavor.

Figure 2C:
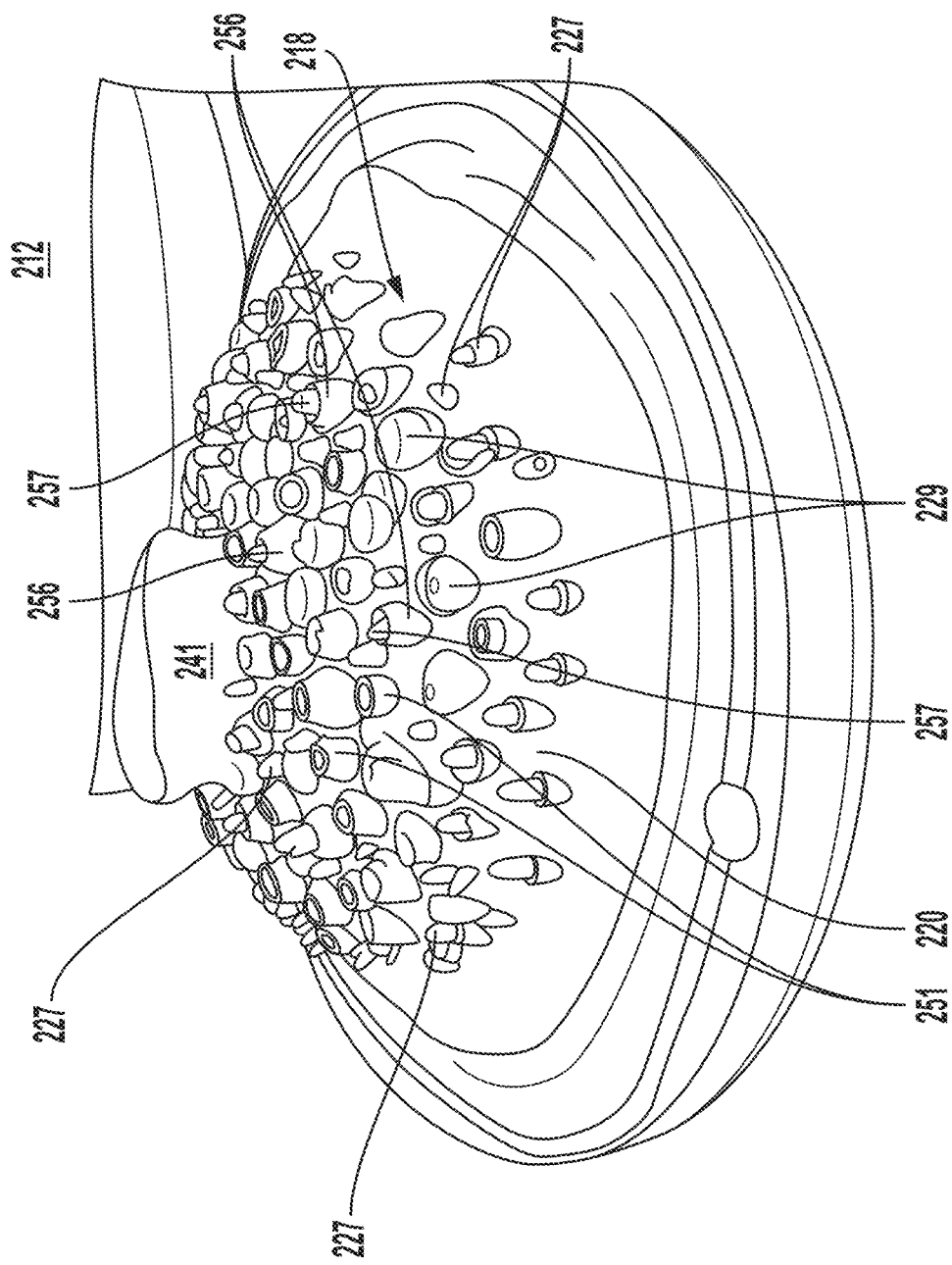
FIG. 2C shows a detailed side elevation view depicting further details of a single male mold half in a further embodiment.

FIG. 2C shows a detailed side elevation view of a single male mold 212 dimensioned to produce any sized scooped out bagel product according to a further embodiment.

The male mold half 212 of FIG. 2C shows the convex shaped or torous shaped raised bagel mold portion 218 dimensioned in height and width to fit within a complementary shaped concave outer female mold half. Interspersed throughout the raised convex surface 220 of the male mold half are formed protrusions 227 including raised finger-like structures, bullet shaped structures, or cone-like structures of various heights, widths and angles. Further interspersed throughout the surface 220 are the mesa or plateau structures 229 of various height, length and width dimensions which protrude from the surface at various locations. The male mold half portion 212 shown in FIG. 2C further includes the raised hollowed crater formations 251 protruding from the surface 218 at various locations. As shown in FIG. 2C, several raised hollowed crater formations 256 include a further interior structure 257 protruding from the center of the crater, which interior structure may be conical shaped, bullet or finger-like structure. In some embodiments, these interior structures 257 may extend beyond a top edge of the raised hollow crater formation such as the interior structure 257A shown in the male mold half view of FIG. 2D, or may not extend beyond a top edge of the raised hollowed crater formation 256 such as the interior structure 257B shown in the male mold half view of FIG. 2D.

As further shown in the male mold half 212 of FIG. 2C is a central region formation 242 which is a raised structure used in forming the characteristic hole in the formed bagel product's middle and shaped accordingly.

Figure 2D:
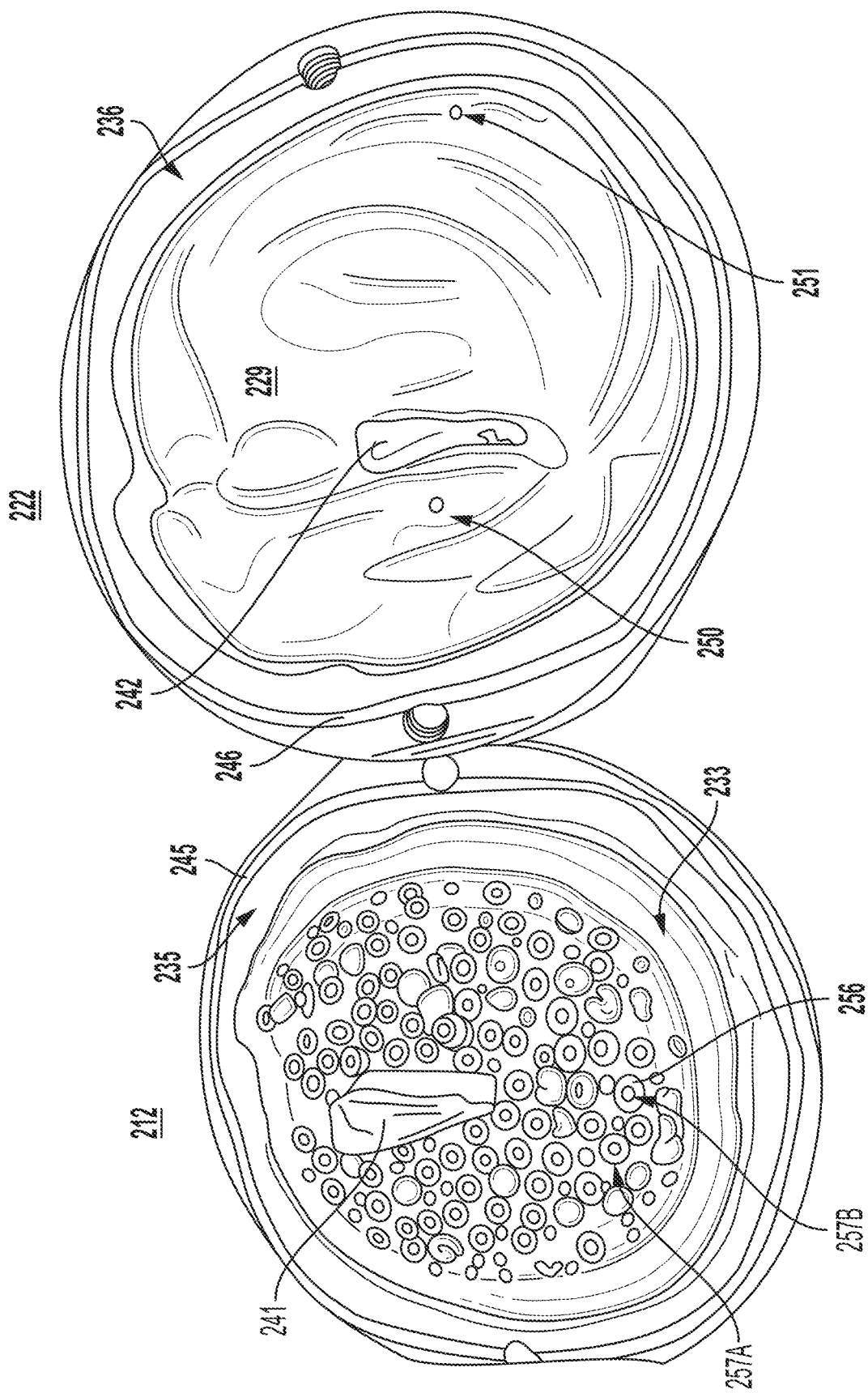
FIG. 2D depicts a top-down view of the male mold half of FIG. 2C and the corresponding female mold half having a complementary concave shaped interior for accommodating placement of the male mold half.

FIG. 2D depicts a top-down view of the male mold half 212 of FIG. 2C and the corresponding female mold half 222 having a complementary concave shaped interior for accommodating placement of the male mold half 212. As shown, the female mold half includes a relatively smooth concave inner surface 229 and is largely smooth as it results in shaping the corresponding outer bagel half product surface. As shown in FIG. 2D, female mold half 222 further is shown having a like central region formation 242 that, when mated with the male mold half, ensures formation of the characteristic hole in the formed bagel product's middle.

In one embodiment, as shown in FIG. 2D, one or more holes 250, 251 is formed through the female mold half 222 that communicates with the external surface of the female mold half 222 for conveying boiling water into the interior space defined when the male mold half 212 is placed within the female mold half 222 when placed in a kettle of boiling water.

As shown in FIG. 2D, both the male mold half 212 and female mold half 222 of FIG. 2C includes a circumferential edge portion 235, 236, respectively, that are configured to complement each other for sealed engagement. For example, the edge or lip portion of male mold half 212 includes a circumferential ridge feature 245 that circumnavigates the edge portion and is dimensioned to mate with a complementary dimensioned crevice 246 formed and circumnavigating the circumferential edge portion 236 of the female mold half 222. Additionally shown in each mold half 212, 222 are screw hole features or bores 219 that are located such that when the male mold half is placed within the female mold half, these bores align to accommodate a screw or like connecting structure such that the male and female mold halves may be compressively engaged with a predetermined amount of dough placed therein. In one embodiment, the connecting structures to keep the molds engaged together may be a fastening means such as clasps, clamps, e.g., spring loaded clamps.

Figure 2F:
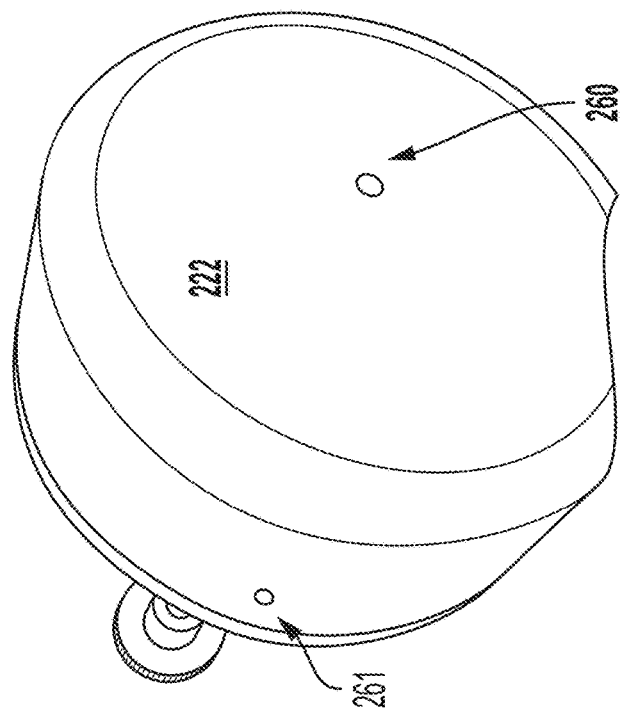
FIG. 2F is a view of the scooped out bagel mold assembly in compressive engagement showing the water conveyance holes that communicate from the exterior mold surface to the interior surface holes as shown in FIG. 2E.
Figure 2E:
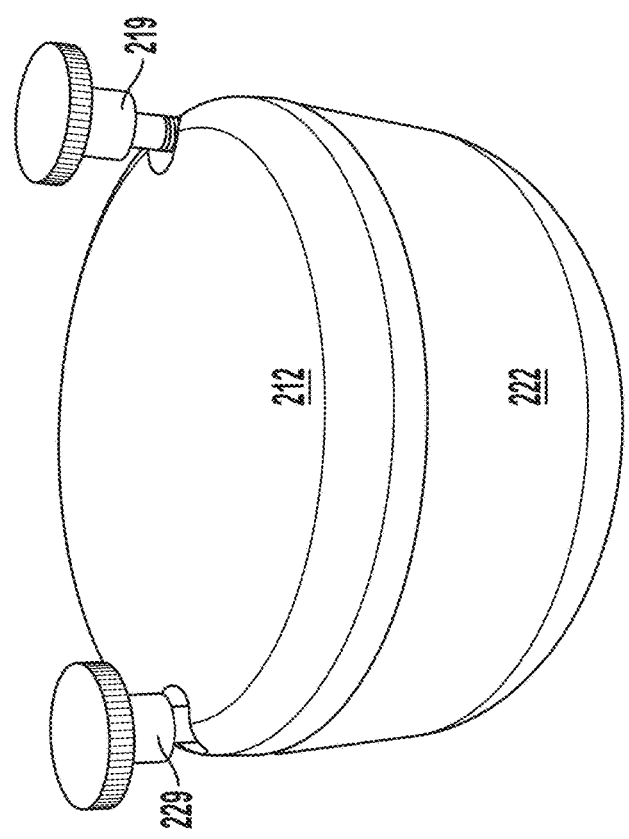
FIG. 2E shows the male mold half and the female mold half in compressive engagement using a device for compressing the mold halves together when making a raw bagel half product in one embodiment.

FIG. 2E shows the male mold half 212 and the female mold half 222 in compressive engagement using lock devices 219, 229, e.g., screws, for engaging the mold halves together and compressing the raw dough placed therein when making a raw bagel half product in one embodiment.

FIG. 2F is a view of the scooped out bagel mold assembly in compressive engagement showing the water conveyance holes that communicate from the exterior mold surface to the interior surface holes as shown in FIG. 2E. In FIG. 2F, the hole 261 shown at the exterior of the female mold half 222 conveys boiling liquid water to the interior hole 251 of FIG. 2E. Likewise, the hole 260 shown at the exterior of the bottom female mold half communicates with the interior hole 250 of FIG. 2E which hole 250 may facilitate draining of the liquid water out of the engaged mold assembly. Although not shown, it is understood that additional holes for conveying boiling liquid water into the interior space of the molds may be provided, e.g., such as at the top surface of the male mold half.

As described herein, the formations 229, 251, 256, 257 of male mold half 212, when compressed with a complementary female mold half 222, form in a raw bagel dough the plurality of stalactite projections (or stalagmite), and hole and crater formations, which together increase the surface area of dough in the resultant scooped out bagel half product while eliminating the excess and unnecessary dough.

Figure 3:
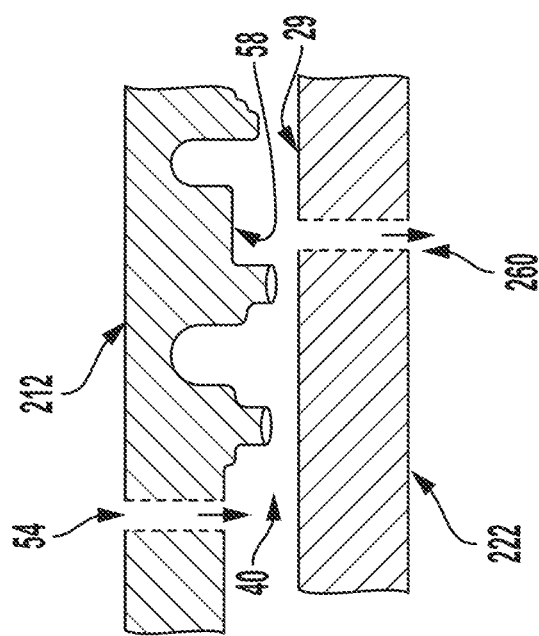
FIG. 3 shows conceptually the mating of the convex shaped male mold 22 with a corresponding female concave shaped female mold 12 in a non-limiting orientation.

FIG. 3 shows conceptually, the mating of the convex shaped male mold 212 with a corresponding female concave shaped female mold 222 in a particular non-limiting orientation. As shown in FIG. 3, the protruding portion of the male mold is indexed precisely with the recessed portion of the female mold. The mold portions (212, 222) are contoured such that when mated, and with sufficient pressure applied to the mold halves, there is defined therebetween a space 40 that accommodates a precisely measured portion of specific dough uniquely suited for bagel production. The pressed molds form in the raw bagel dough the plurality of stalactite projections (or stalagmite), hole or crater formations and thereby increasing surface area of dough in the resultant scooped out bagel half while eliminating the excess and unnecessary dough.

Figure 4:
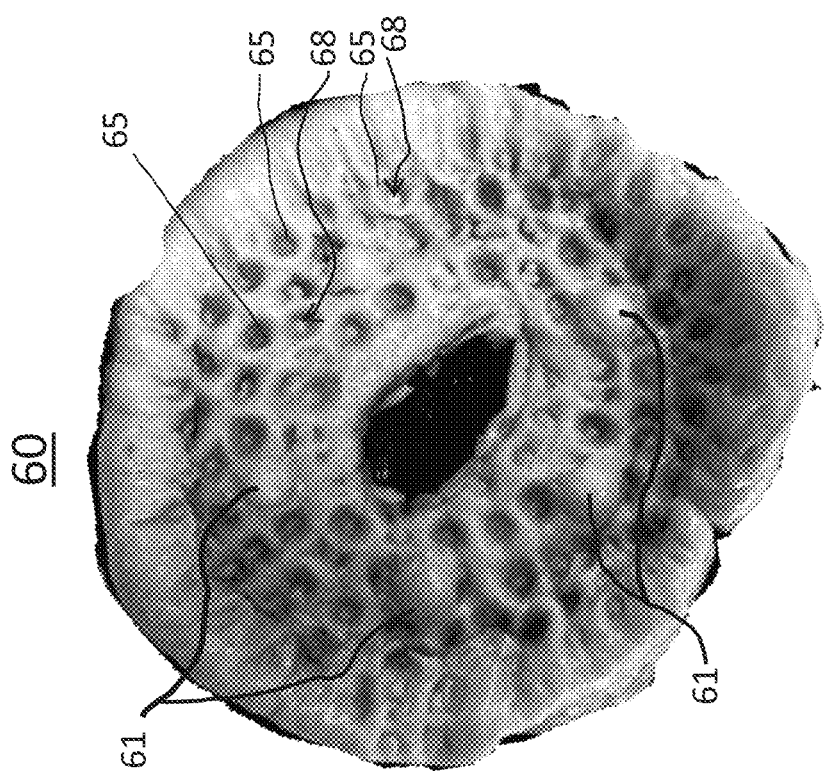
FIG. 4 shows a scooped out raw bagel product 60 resulting from mating of the female and male mold halves 12 and 22 when raw bagel dough product is placed within the space 40 formed between the two halves.

FIG. 4 shows a scooped out raw bagel product 60 resulting from mating of the female and male mold halves (12, 22), e.g., when raw bagel dough is placed on a mold half and compressed within the space 40 defined between the two halves. As shown in FIG. 4, the resulting formed raw scooped out bagel product maintains the characteristic bagel shape, yet utilizes significantly less dough, e.g., in one embodiment, approximately ⅔ less dough, than a comparable sized "whole" doughy bagel. Consequently, the resultant scooped out bagel product when baked will contain less calories and less wasted food product while maintaining consistent flavor and texture. That is, shown in FIG. 4 is a "scooped out" raw bagel product 60 including the plurality of doughy flavor spikes 61 resulting from the dough when formed into the holes in the male mold half and additionally the flavor pits 65 formed by the raised crater formations in the mold. In one embodiment, most of the flavor pit formations 65 include an internal protruding stalactite or stalagmite formation 68 rising at or near the center thereof.

In one embodiment, prior to placing raw bagel dough in the molds for shaping and/or baking, the raw dough may be chilled, e.g., placed in a chilled environment such as a refrigerator or "cooler" for a pre-determined period of time. Subsequently, when ready for baking, a measured portions of the chilled dough may then be reinserted into the mold halves which are compressed to recreate the scooped out bagel form. They are boiled in boiling water within the compressed mold and subsequently baked in an oven. Prior to baking, the water drains out of the assembled molds through outlets.

In this embodiment, the raw bagel dough products while located internal to the engaged mold halves, may be boiled for a predetermined amount of time, within the engaged mold halves. After the boiling of the raw bagel dough products internal to the engaged mold halves, the water is drained, and without disengaging the mold halves, the boiled shaped product is baked within the sealed mold assembly in an oven until the baking process inside the mold is nearly complete. Then, the mold halves may be disengaged, and upon release, the hollow or scooped out bagel half is further baked to complete crisping of the outer skin.

Figure 5B:
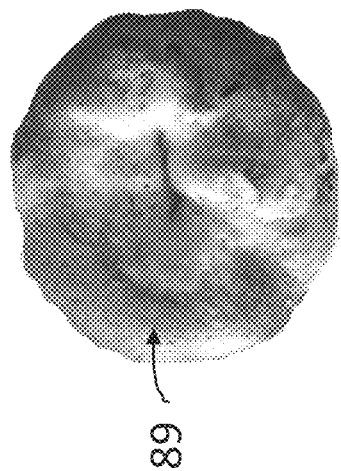
FIGS. 5A and 5B show an example of a fully baked scooped out bagel product 80 with FIG. 5A showing an inner surface of the baked product 80 and FIG. 5B showing a smooth, outer surface of the baked scooped out bagel product 80.
Figure 5C:
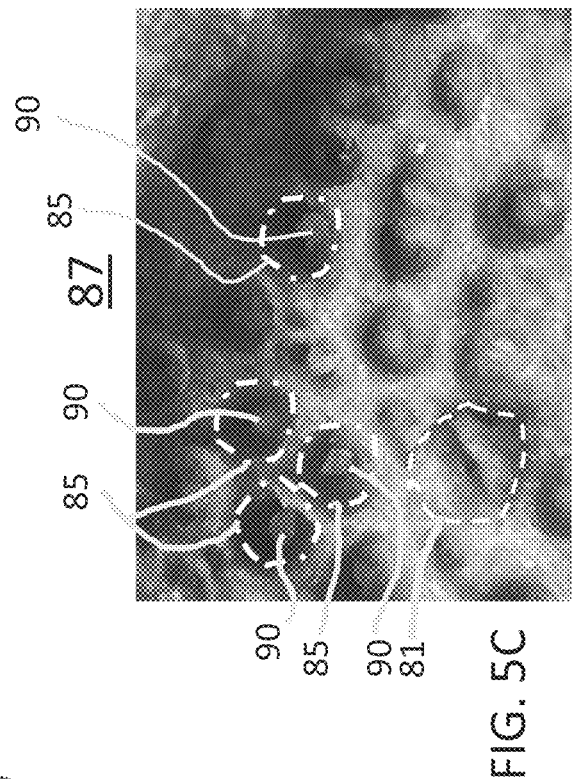
FIG. 5C shows a more detailed view of an inner surface portion of the fully baked scooped out bagel product shown in FIG. 5A.
Figure 5A:
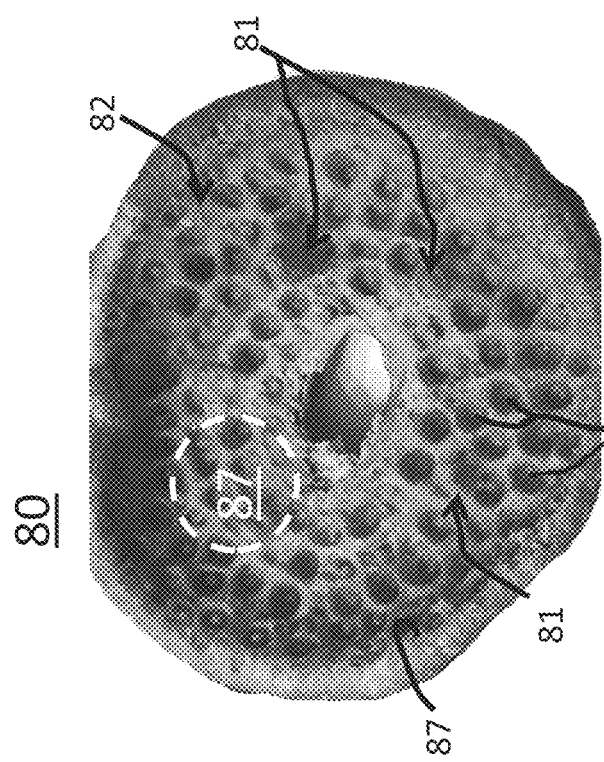
Figure 5D:
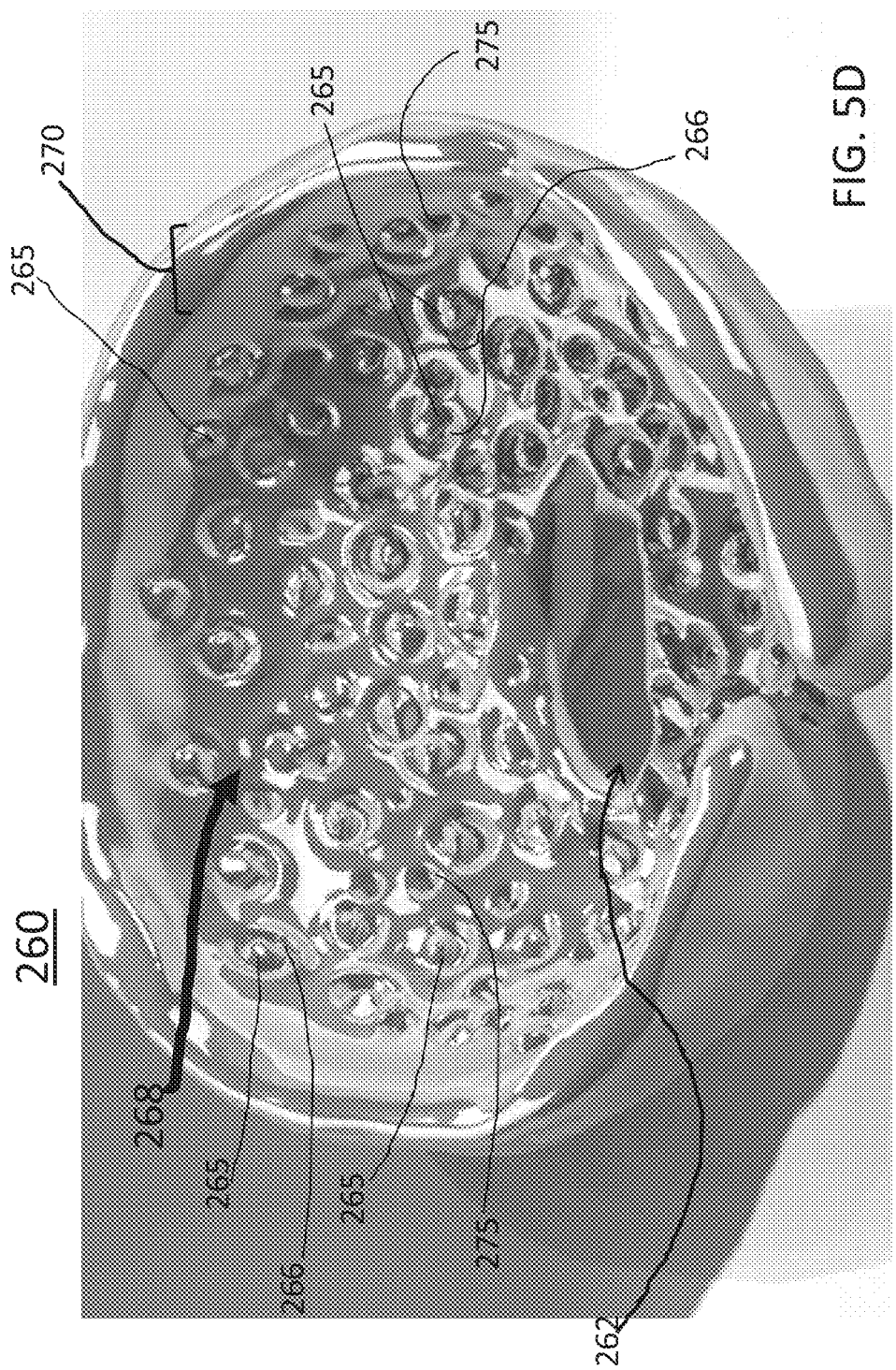
FIG. 5D is a digitized model depicting the inside of the scooped out bagel product described herein.

As a result of processing the scooped out raw bagel product, which process includes boiling the raw dough within or external to, the molds, and baking the boiled raw scooped out bagel dough, the scooped out bagel product provides a ready-made receptacle as shown in FIG. 5A, 5D for any spreads or food salads desired to be inserted, obviating the need to slice a "whole" bagel product and subsequently remove dough and wastefully throw it away.

FIG. 5A shows an example of a fully baked scooped out half-bagel product 80. The bagel product 80 includes an inner surface 82 including doughy stalactites (flavor spikes) 81 rising from the hollowed out inner surface. These stalactites (or stalagmites, depending upon the bagel orientation) are the result of the holes or depressions 59 formed in the surface 58 of the inner male mold half 12. Further included are the formed plurality of individual and distinct holes or crater-like formations 85. These plurality of distinct holes or crater-like depressions 85 are alternately referred to as flavor "pits" and are formed as a result of the raised hollowed craters 51 of the surface 58 of the inner male mold half 12 such as shown in FIG. 2A, 2B. The resulting baked scooped-out bagel-half product 80 further includes an outer bagel perimeter or edge 87 which is formed as a result of the trough 53 of the bagel mold half 12. The edge perimeter 87 cascades to define a scooped out trough deep enough to allow placement and stable retention of toppings or food salads within the confines of the bagel half 80.

Figure 9:
FIG. 9 depicts a fully baked bagel product 80, showing the outer surface of the baked scooped out bagel product described herein.

FIG. 5B shows a smooth, crunchy and glazed outer surface 89 of such baked, scooped out bagel product 80 of FIG. 5A as is typically characteristic of bagel products Another example is depicted in FIG. 9. The outer surface 89 of the bagel product shows the contour and shape of the bagel product, so that one of ordinary skilled in the art can recognize the bagel product 80 as a bagel. FIG. 5C shows a detailed close-up view of a portion 87 of the formed fully baked scooped out half-bagel product 80 shown in FIG. 5A, In this resulting baked bagel portion 87, there is shown the stalactite formation 81 of baked dough protruding from the flat inner surface of the baked bagel half above a flavor pit. Additionally shown are resulting flavor pit formations 85. Each flavor pit (hole formation) may optionally include a further internal stalactite formation or plateau projection 90 of baked dough protruding from the center of the flavor pit 85. The flavor pits 85 having a protruding stalactite or plateau projection baked dough feature 90, are formed in the resulting scooped-out baked bagel-half product 80 as a result of the raised craters 51 having holes 52 therein of the male bagel mold half 12. Depending upon the size and density amount of raised craters 51 of the corresponding male mold half, there is a practical limit as to the amount of holes (flavor pits) provided. The flavor pits 85 containing plateau projections 90 and stalactites (or stalagmites depending upon orientation), as well as the scooped out internal portions of the finished baked bagel product, permit the insertion of spreads, salads and any desired fillers.

In some embodiments, the resulting scooped out baked bagel product 80 of FIGS. 5A and 5B contains significantly less dough than a correspondingly sized conventional whole bagels, e.g., in one embodiment, less that ⅓ the amount of dough than its whole bagel equivalent. The amount of dough present can be controlled by the amount of stalactites/stalagmites and their height and depth. Stalactites (or stalagmites) 81 and holes 85 with formed stalactites 90 therein populate the reduced doughy floor and inner sides of the bagel 80. These plateaus and valleys of dough provide enough spongy dough to satisfy a consumer's palate without the unnecessary full thickness dough that is commonly disgorged by the consumer of this popular food item.

FIG. 5D is a digitized model representation of the scooped out bagel product 260 that would be produced using the male mold and female mold halves 212, 222 shown in FIG. 2D. It depicts the inside of the bagel product. As shown by the model of the bagel product, the half portion 268 has a thin layer of a substantially reduced amount of material 270 that retains its characteristic central hole 262. Formed at the surfaces of the layer 270 are interspersed stalagmites or flavor "spikes" 265 which are protrusions resulting from use of the mold halves. In some instances, the flavor spikes protrude from a center of a corresponding formed crater like feature 266. Additionally, interspersed throughout the surface of this layer are flavor pits 275. The presence of flavor pits and spikes results in an increased hollowed bagel inner surface area for retaining salads and spreads.

Figure 10:
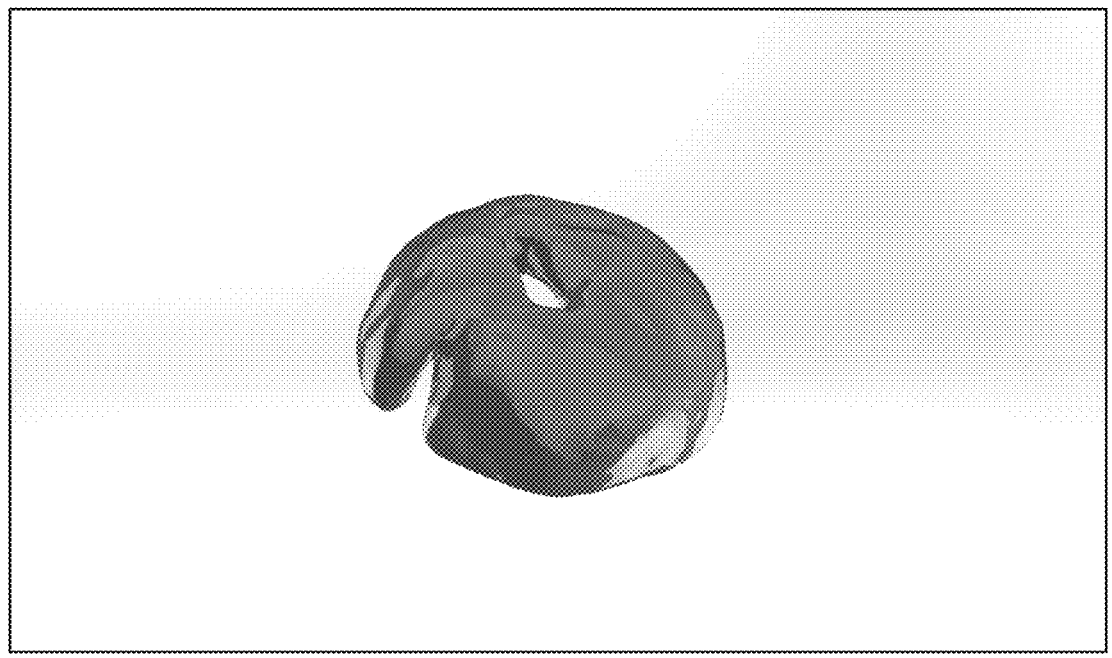
FIG. 10 depicts a digitized model of the scooped out bagel product described herein.

FIG. 10 depicts the basin-like aspect of the scooped out bagel product 80. It is another view of the digitized model of the bagel product depicted in FIG. 5D. FIG. 10 is a digitized model representation of the bagel product depicting the inside of the bagel product described herein and illustrating the reduced amount of material present in the bagel half. It shows the depth in a three-dimensional like representation, in which the bagel product maintains the basin-like shape with a reduced amount of material upon which foods or spreads may be applied.

In one embodiment, as shown in FIG. 6, a plurality of mold halves are formed as a mold assembly 70 for automated or semi-automated mass production of scooped out bagels. In FIG. 6, in assembly 70, multiple female mold halves 22 are formed in an array on a planar bottom portion, such as a tray structure 72, and a corresponding multiple of male mold halves 12 are formed according to the array structure in a planar top tray structure 74, each male mold half indexed for engagement with a respective female mold half. The tray structure may be a stainless steel or like material and each of the mold halves in the respective top and bottom tray assemblies may be an integral with the flat planar (e.g., stainless steel) tray structure.

In a further embodiment, one or more rows of female mold halves and male mold halves are built into a respective conveyor belt in opposing fashion, each mold being a platinum silicone material or like baking safe material. The mold halves are joined in pressurized engagement with the predetermined amount of raw bagel dough placed on one of the halves, e.g., female half.

In order to achieve a desired skin and texture of the outer portion of the baked scooped out bagel product, in one embodiment, stainless steel pipettes or alternative material conveyance structures 76, 77 (e.g., inlets or outlets) are inserted into either upper or lower, male or female portions of the mold or molds, and include built in ports 78, which, when submersed in a kettle or cauldron boiling water, convey the boiling water from the kettle or cauldron of boiling water into the interior of the engaged mold assembly to contact the raw dough surfaces within the engaged mold halves as explained below.

In a further embodiment, as shown in the cross-sectional view of assembled mold halves 12, 22 shown in FIG. 3, ports for conveying boiling water may be built into the male and female mold halves. For example, FIG. 3 shows a cross-section view of a narrowed channel, conduit or opening 54 that runs the height of the male mold half 12 from an inlet or orifice formed at its exterior surface to interior surface 58 to permit entry of boiling water into the defined space 40 for contacting the surfaces of the raw dough (not shown) placed in the defined space between the mold halves. Further, the cross-section view shows a narrowed channel, conduit or opening 56 that runs the height of the female mold half 22 from its interior surface 59 to an outlet or orifice formed at an exterior surface providing a drainage port that permits exiting of the water from the defined space 40 between the mold halves via gravity when the engaged mold assembly exits the boiling water kettle or cauldron. In one embodiment, the engaged mold assembly exits the boiling water kettle or cauldron at an inclined orientation via gravity as the conveyor belt of the sealed molds traverse to the oven to be baked. While only one channel is shown in either mold half 12, 22 there may be multiple channels 54, 56 formed in each, e.g., 2, 4, 8 or more openings, and they may be placed at various locations within each mold half. Moreover, while the openings 54, 56 in each respective mold half is shown oriented perpendicular with respect to the outer surface of each mold half, it is understood that these openings may be oriented at an angle. In one embodiment, these openings or ports 54, 56 may be dimensioned from between 2 mm-3 mm in diameter which is sufficient to permit respective entry to and exit of boiling water from the interior of the sealed mold assembly, however, prevent the raw bagel dough from plugging up the respective openings.

In one embodiment, in a mass production setting, raw bagel dough product may be obtained by combining and mixing various ratios of ingredients. Ratios of standard ingredients used in the production of scooped out bagel dough may be modified and further ingredients may be added (e.g., raisin, egg, pumpernickel, salt or seeded, etc.) as known in the art. As a non-limiting example, one batch of bagel dough for making the scooped out bagel product is formed by combining, e.g., in a bagel dough mixer (not shown) the following ingredients normally used to make a bagel. The amounts used are sufficient to fill the bagel molds described herein and form the bagel products described herein. For example, using the following ingredients and the process described herein, a scooped out bagel product can be produced: high gluten flour, e.g., about 100 lbs; water, e.g., about 50 lbs.; salt, e.g., about 1¼ lbs.; brown sugar, e.g., about 6 lbs.; shortening, e.g., about 1½ lbs.; liquid malt, e.g., about 2 lbs.; malted barley flour, e.g., about 1¼ lbs.; and yeast, e.g., about 2 lbs. The dough used to inject into a platinum silicone bagel mold half may also be infused with various ingredients so as to vary the texture and flavor of the product i.e.: salt, sesame seeds, panko, raisins or berries. Additional ingredients may include, but are not limited to commonly used food product preservatives, e.g., BHA, BHT, and anti-oxidants.

Assuming standard atmospheric conditions in the production area such as ambient temperature, water temperature, a mechanical mixing is performed by a mixing machine, and which speed may be controlled and varied.

The resulting bagel dough produced may then be placed into a cooled environment, e.g., refrigerator or freezer, for a short and prescribed period to achieve the desired effect on rise as well as the yeast proportion. Then, the raw dough may then be transferred from the freezer into a hopper where smaller precise amounts of dough may be extruded. It is understood that, in one embodiment, the raw dough is not frozen, but rather is chilled in the cooled environment to decrease the time required to help retard the rise (proofing). It may alternatively be refrigerated without freezing for an increased amount of time.

After a proscribed time of chilling the cooled dough is placed into a hopper and is then funneled into a conduit where it is extruded and subsequently precisely severed by a guillotine blade at the mouth of the funnel. Once placed in the hopper, the bagel dough machine 200 is controlled to extrude the raw bagel dough 160 into precise amounts 166. After deposit of a precise amount of raw bagel dough into the female portion of the mold, the male conveyor belt with incorporated male molds engage and compressed the dough as the process proceeds to boiling then gravity drainage on an inclined plane as it travels still compressed to the oven to bake.

Figure 8:
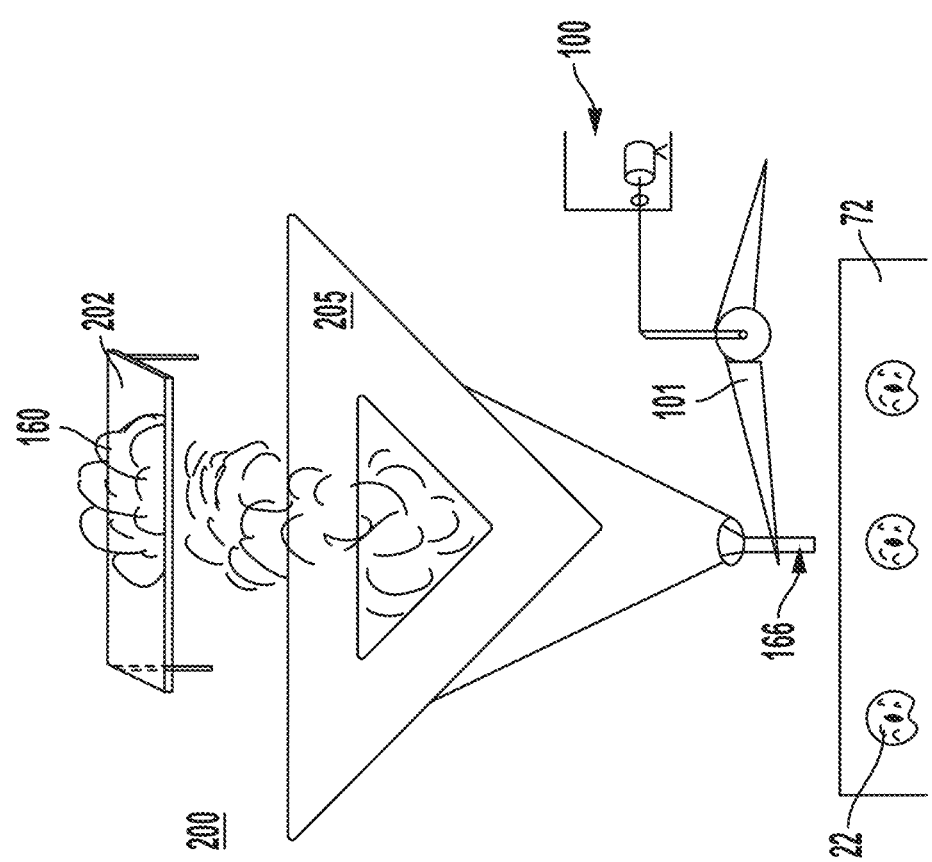
FIG. 8 shows an embodiment implementing a guillotine motor and blade assembly 100 in which a blade is controlled to slice pre-measured portions of raw dough extruded from a dough hopper via dough extrusion assembly.

FIG. 8 shows an embodiment implementing a guillotine motor and blade assembly 100 in which a blade 101 is controlled to slice pre-measured portions of chilled raw dough 166 extruded from the hopper 202 via dough extrusion assembly 205. In one embodiment, the precise amount may be stored on a tray and subsequently placed in a freezer until such time as they are ready for baking.

However, in a further embodiment, as further shown in FIG. 8, lower tray assembly 72 having an array of lower convex female mold halves 22 may be registered (manually or under automatic control via mechanical arms 82) under the blade assembly/blade 100, 101 to receive the precise amount of chilled dough at each convex side down female mold half.

In further embodiment, there may be multiple bagel machine 200 assemblies each with an extrusion and blade assembly in which raw dough may be extruded and a precise amount obtained for simultaneous placement within a registered underlying lower female scooped out mold 22.

Figure 7A:
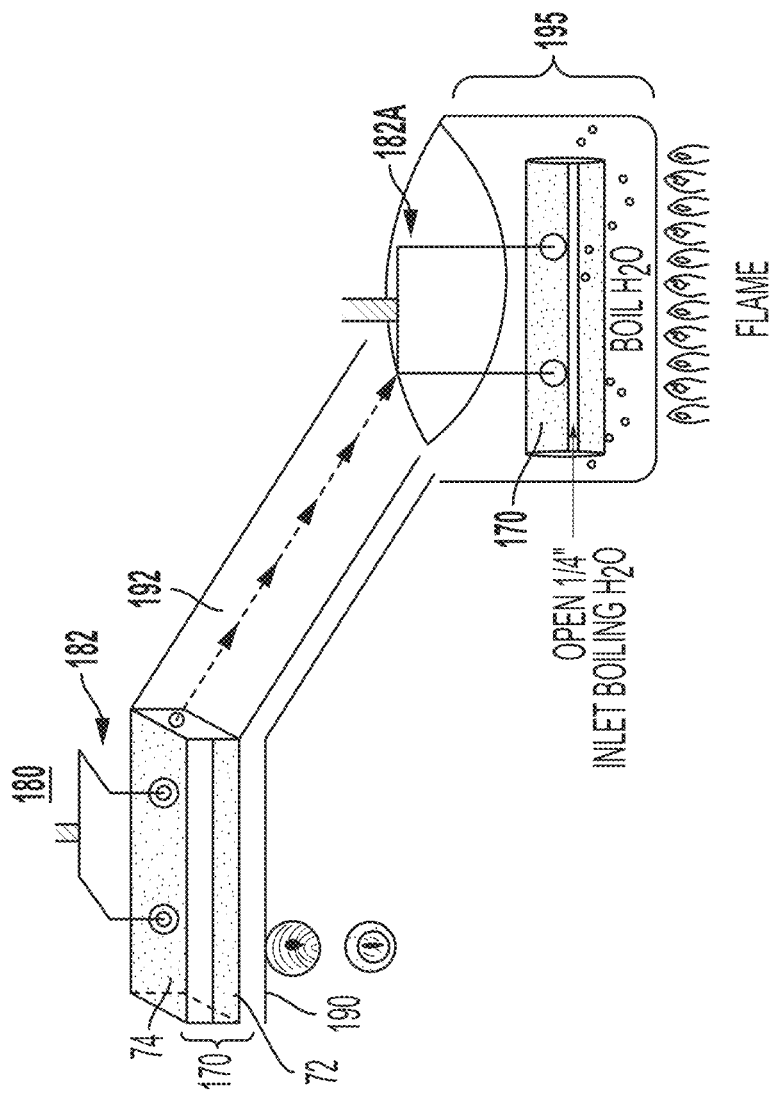
FIGS. 7A and 7B depict a system and method for making the scooped out bagel product of FIGS. 5A, 5B with FIG. 7A depicting steps leading up to and including the boiling of the bagels in the sealed mold assembly.

As an example, a predetermined amount of raw bagel dough, e.g., at least ⅔ less dough than an identical sized conventional whole bagel product, may be located in each female mold half 22 of the assembly 72, in the automated fashion. As shown in FIG. 7A, once the predetermined amounts of raw bagel dough portions are placed in each mold half 22, a mechanical assembly 180 may be controlled to register a male mold assembly portion 74 into precise position above the scooped out bagel dough filled female counterparts in tray 72. Here, the male mold assembly portion 74 may be manually controlled or electronically controlled by automating a mechanical or hydraulic assembly 180 to extend mechanical arms 182 to register the male mold assembly 74 for engagement with the corresponding female mold assembly 72. Mechanical assembly 180 may be further programmed to lower the male mold assembly 74 onto the female mold assembly 72 having raw dough in female mold halves therein, and impart an additional amount of pressure to the upper assembly 74 for sealed engagement therewith. Once engaged, in each mated male and female mold half the pressure imparted by mechanical arms 182 forces the raw bagel dough to take the shape of the space 40 as shown in FIG. 4. In doing so, the raw bagel dough forms the flavor pits, with internal projection and spike stalactites in its raw form within the engaged mold halves in assembly 170. The controlled mechanical assembly 180 may be subsequently electronically controlled to retract the mechanical arms to remove the male mold assembly 74 from engagement with the female mold assembly 72 after accomplishing the pressing procedure.

Figure 7B:
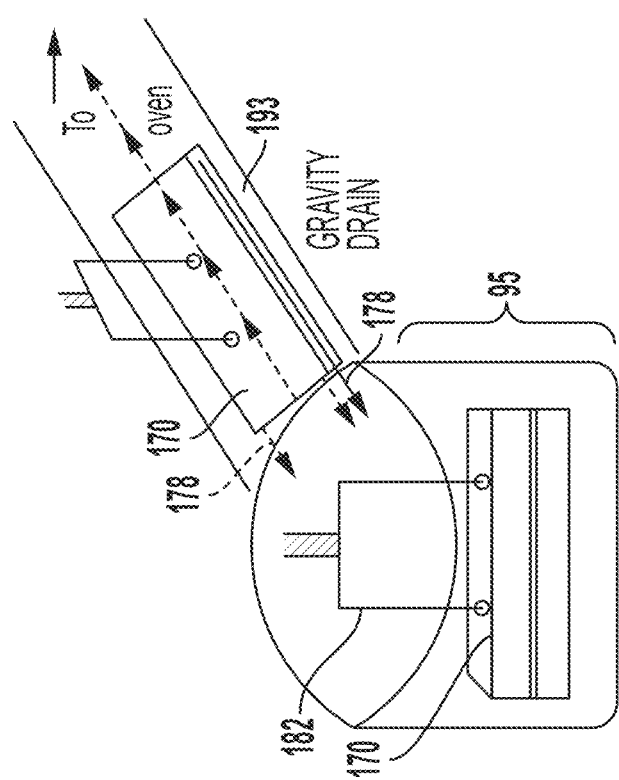

FIGS. 7A and 7B depict a method for making the scooped out bagel product of FIGS. 5A, 5B and 5D. In one embodiment, after configuring male mold halves upper tray 74 and the corresponding lower female mold planar tray structure 72 in sealed engagement forming assembly 170 with bagel dough product therein using controlled mechanical assembly 180, the assembly 170 may be positioned on a moving platform for further conveyance to a boiling station, or further conveyed by mechanical aims 82 to the boiling station.

In particular, referring to FIG. 7A, in one embodiment, the engaged mold assembly 70, may be conveyed to a location of a kettle or cauldron 95 of boiling water. Mechanical arms 82 may then be extended to submerge the entire assembly 70 into the kettle 95 of boiling water. Boiling water enters the space 40 having the shaped raw bagel dough content therein through each female mold and mold halves via the formed inlet and outlet structures (76, 77, respectively) and ports 78 which may include valves (not shown) that open to receive the water once submerged. In an embodiment, boiling hot water fed from the constantly heated kettle or cauldron 195 is received at all sealed engaged mold halves in the engaged assembly 170 simultaneously. In one embodiment shown in FIG. 7A, the whole assembly 70 is submerged in the cauldron 195 so that water boils in the engaged mold halves for the pre-determined amount of time. The dough only rises in conformity with the mold.

The mechanical arms may be controlled to retract and enable remaining water to exit the assembly 170. In one embodiment, as shown in FIG. 7B, the assembly 170 of the boiled raw scooped out bagel dough is caused by mechanical arms 82 to be conveyed upstream at an incline such as to provide sufficient water drainage via gravity through the inlet and/or outlets and through ports 78 in communication with each of the engaged female and male mold halves in the assembly 76. The flowing water may drain into a receptacle (not shown).

In one embodiment, simultaneous drainage may occur as timed valve openings (not shown) provided at the mold assembly 70 release the boiling water for drainage into a receptacle.

After boiling the raw bagel contents within the mold assembly 70, the mechanical assembly 180 may use arms

182 to further convey assembly to a baking station, where, in one embodiment, the mechanical arms are caused to disengage the top tray 74 and bottom tray halves to release the formed dough product. This product may be further conveyed to trays (not shown) for placement within an oven for baking thereat. In one embodiment, after boiling inside the sealed mold assembly 170, the method may include flipping the drained scooped out bagels from the mold onto a baking platform convex side up for baking.

For example, when conveyed on the female mold tray assembly 72, the drained (boiled) scooped out bagels arrive on the next segment 193 of the conveyor belt and the molds on or incorporated into the tray are inverted, or the whole tray is inverted to thereby release the scooped out bagels, e.g., convex side up onto a baking tray (not shown) ready to be placed inside an oven shelf for baking at a pre-determined temperature, e.g., about 500 degrees F., for a proscribed time. Optionally, or in addition, once the outer surface skin of the baked scooped out bagel product has formed, the scooped out bagels may then be inverted or baked from below in order to form a skin on the inner concave side with all the stalagmites and stalactites and flavor pits. That is, once the dough skin had crisped in the oven and achieved its classic bagel color, it may be flipped over for further baking in the oven. Thus, the dug out portion of the scooped out bagel may receive a bake producing a similar crispness while retaining stalactite and stalagmite chewy dough core. The result is an excellent likeness to a half bagel, scooped out, with substantially fewer calories, ideal shape and flavor.

In an alternative embodiment, the same result can be achieved by using conveyor 190 in which, after forming the scooped out raw bagel products in the sealed assembly 170, the male mold assembly 74 releases and the fully formed scooped out bagels travel on a conveyor belt 192 inside the female mold into tray 72 for conveyance into a boiling water bath for the proscribed boil time.

In such an embodiment, when placed on or as assembled part of a conveyor having platinum silicone molds, the sealed mold assembly including the boiled raw bagel content therein, is conveyed to the oven for baking within the sealed mold in order to retard rise and distortions. It is understood that such thin metal molds with an interior platinum silicone lining may be used to decrease baking time in the oven due to increased efficiency in heat distribution. Thus, baking occurs initially in sealed molds prior to release for completing the final script of the bagel product's outer skin.

Alternately, the tray 72 and shaped raw bagel products may be fully released from the molds, and travel along a declining plane, e.g., a trough with flowing water to convey the fully formed scooped out bagels to the boiling station.

The system of FIGS. 7A, 7B utilizing a platinum silicone mold halves or mold halves coated with platinum silicone material repeatedly produce scooped half-bagel products with flavor pits and spikes on a totally consistent basis. By the adaptation and utilization of the silicone mold it obviates the necessity to utilize any releasing agent, e.g., oil.

In one embodiment, to allow for a method of baking on a mass production line basis, a continuous conveyor belt may be implemented utilizing the baking approved platinum silicone molds, where one set of mold halves is integrally formed as part of the belt. This conveyor belt may also be built within a flexible and baking approved matrix to allow a decreased thickness, e.g., an amount of millimeters, of platinum silicone to be used and decrease the baking time by allowing more heat be distributed to the dough through a thinner amount of platinum silicone. In such an embodiment, the male bagel mold half of platinum silicone is inserted and compressed into the corresponding integral female mold half having the exactly measured portion of dough and once engaged, glides into the boiling water bath for the proscribed time. Here, a balance is struck in order to achieve ideal strength of the molds and conveyor belts, while at the same time, decreasing the rate and amount of heat distribution during baking. At the end of this process the bagel product will be packaged for distribution.

For example, a predetermined amount of the half scooped out bagel products, e.g., in denominations of two, four, six or more scooped out bagel product halves, may be arranged in a stacked formation for packaging, e.g., plastic packaging bags for bakery products as known in the art. The package containing the stack of scooped out bagel product halves may be transferred to retailers who may sell them as packages. Additional processes may entail freezing the scooped out bagel product halves in their packages so that they may be sold as packages with a grocery store's other freezer products.

In such an embodiment, a multiplicity of the identical platinum silicone male and female mold half forms are replicated integrally within the continuous conveyor belt system. Mold halves of different size and shape may be integrally formed on different conveyor belts where the dimensions of each mold form may be designed to vary in both shape and size of the final product.

In a further embodiment, two belts may be provided that are mirrored. In such an embodiment, a bottom conveyor belt may include integrally formed female bagel half molds that create the outer form of a traditional hand formed bagel. A corresponding upper conveyor belt integrally includes a respective counterpart male bagel half mold, and is operated to press and depress the dough that has been extruded into a corresponding female mold half. The unique stalactites and stalagmites and flavor pits having an internal stalactite projection are formed within and above these flavor cells by this process.

In a further embodiment shown in FIG. 7A, sealed male and female mold portions that may be constructed integrally within a conveyor belt (e.g., platinum silicone) travel downward into a cauldron of boiling water for a proscribed period of time. The boiled dough locked within the male and female portions of the molds and integral to the two meshed conveyor belts may travel on an inclined plane where the remnants of water drain by gravity through the same ports that served as inlets for the boiling water. The still linked belts continue to the oven and are baked within the molds for a proscribed period of time. Near the termination of the proscribed bake the belts disengage and the formed raw scooped out bagel half product is baked convex side up to achieve a final glazed skin.

As shown in FIGS. 3 and 6, channels are built into these molds assemblies that let boiling water enter and later exit the engaged assembly form as the sealed belts travel into a cauldron of boiling water for a proscribed period of time. Water, that has entered the engaged assembly form and the dough contained within it, will drain as the conveyor belt exits the cauldron at an elevated angle as shown in FIG. 7B. Drainage occurs via gravity. The cooling water is diverted into a containment vessel to be discarded. The cauldron is refilled as necessary and boiling temperature is maintained with consistency. The male and female sections of the conveyor belt remained sealed and help to compress and inhibit the dough from rising, therefore maintaining the desired bagel product shape through the boiling and baking processes. Towards the end process the two belt sections may open and release the bagel product for a final uncovered bake. For example, baking for a few minutes outside the mold ensures a crispy outer skin prior to packaging. In some embodiments, the two mold halves are first baked, and then the mold halves are separated.

Once baked, the scooped out bagel products such as shown in FIGS. 5A and 5B may be cooled and further conveyed to a packaging station, where they may be individually wrapped and sealed in clear plastic. Finally they may be packaged in multiples of six, eight or twelve pieces.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A mold for making a bagel product, the mold comprising:
    a first unitary bagel mold half having a recessed portion therein shaped for receiving a dough material used to make a bagel product, and
    a second unitary bagel mold half having a protruding portion complementary to said recessed portion and adapted for placement within said recessed portion of said first unitary bagel mold half such that a space is defined between the recessed portion and protruding portion, the defined space accommodating placement of a predefined amount of bagel dough material;
    said first unitary bagel mold half and second unitary bagel mold half being adapted for sealed engagement for compressing said predefined amount of dough material within said defined space,
    wherein a surface of said recessed portion, a surface of said protruding portion, or both said surfaces of said mold half recessed portion and said mold half complementary protruding portion include a plurality of holes, depressions, and a plurality of projecting crater formations having a hollow interior, the plurality of depressions extending below the surface of the mold half recessed portion or mold half protruding portion, and each projecting crater formation having a raised elongated body portion extending to a height above the surface of the mold half recessed portion or the mold half protruding portion and including the hollow interior.

2. The bagel product mold as claimed in claim 1, further comprising:
    an input conduit formed in either said first or second bagel mold halves and adapted for receiving a source of boiling liquid for conveyance to the space defined between the recessed portion and protruding portion when said halves are engaged; and
    output conduit formed in either said first or second bagel mold halves and adaptable for releasing said liquid source from said defined space.

3. A method of making a hollowed bagel product comprising:
    inserting a dough material into a first unitary bagel mold half having a recessed portion therein shaped for receiving a dough material used to make a bagel product; and
    engaging a second unitary bagel mold half with said first unitary bagel mold half to form a sealed assembly, said second unitary bagel mold half having a complementary protruding portion adapted for placement within said recessed portion of said first unitary bagel mold half such that, when engaged, said dough material takes a shape in a space defined by surfaces of said recessed portion and protruding portion, wherein a surface of said recessed portion, a surface of said protruding portion, or both surfaces of said recessed portion and said complementary protruding portion include a plurality of holes, depressions, and one or more projecting crater formations having a hollow interior, with the plurality of depressions extending below the surface of the mold half recessed portion or mold half protruding portion, and each projecting crater formation having a raised elongated body portion extending to a height above the surface of the mold half recessed portion or the mold half protruding portion and including the hollow interior;
    supplying a flow of boiling water to said defined space having said dough material hollow shaped therein;
    boiling said hollow shaped dough material while in said engaged mold halves for a pre-determined amount of time;
    releasing said water after boiling said hollow shaped dough material from said defined space; and
    baking said boiled hollow shaped dough material for a pre-determined amount of time to form said hollowed bagel product.

4. The method as claimed in claim 3, wherein said baking of said boiled hollow shaped dough material occurs while engaged within said first and second unitary bagel mold halves.

5. The method as claimed in claim 3, wherein after said releasing said water, separating the first and second unitary bagel mold halves from engagement, and removing the boiled hollow shaped dough product from said first and second bagel mold halves for said baking.

6. The method as claimed in claim 3, wherein said supplying a flow of boiling water to said defined space with said dough material shaped thereby comprises:
    providing a boiling water flow to an input conduit formed in either said first or second bagel mold halves, said input conduit adapted to supply boiling water to the space defined between the recessed portion and protruding portion when said halves are engaged to subject said hollow shaped dough material therein to boiling water.

7. The method as claimed in claim 3, wherein said supplying a flow of boiling water to said defined space with said dough material shaped thereby comprises:
    submerging the sealed assembly in a cauldron of boiling water wherein boiling water flows through an input conduit formed in either or both said first or second bagel mold halves, said input conduit means adapted to provide boiling water to the space defined between the recessed portion and protruding portion when said halves are engaged to subject said hollow shaped dough material therein to boiling water.

8. The method as claimed in claim 7, wherein said releasing said water after boiling said hollow shaped dough material from said defined space comprises:
    removing said sealed assembly from said cauldron of boiling water for a time sufficient for draining water via output conduit formed in either or both said first or second bagel mold halves after said boiling.

9. The method as claimed in claim 3, wherein said engaging the second unitary bagel mold half with said first unitary bagel mold half further comprises:
applying a compressive force to either one or both of said first and second bagel mold halves so that raw dough material within said defined space takes the shape defined by both surfaces of said first and second mold halves.

10. The method as claimed in claim 4, wherein within one or more of said plurality of projecting crater formations is a plateau projection of dough that rises above a bottom surface of the projecting crater formation.

11. The method as claimed in claim 3, wherein said baking said boiled hollow shaped dough material for a pre-determined amount of time to form said hollowed bagel product comprises:
initially baking said hollowed bagel product convex-side up in an oven for a first pre-determined amount of time;
turning over said product; and
baking a side with said convex-side down for a second pre-determined amount of time, said first and second pre-determined amounts of time amounting to less time than required to bake a whole bagel product.

12. A bagel product mold assembly for making plural bagel products, the assembly comprising:
a first tray having a plurality of female bagel mold halves, each of the plurality of female bagel mold halves having a recessed portion therein shaped for receiving a dough material used to make a bagel product shell having a doughy floor and inner surface, and
a second tray having a plurality of male bagel mold halves, each of the plurality of male bagel mold halves configured for alignment with a corresponding female bagel mold half, the male bagel mold halves each having a protruding portion complementary to a respective recessed portion of said female bagel mold halves and adapted for placement within said recessed portion of a corresponding aligned female bagel mold half such that a space is defined between the recessed portion and protruding portion,
a fastener engaging the second tray of plural male bagel mold halves into corresponding first tray of female bagel mold halves to form a sealed assembly, wherein said defined space accommodates placement of a pre-determined amount of dough material,
wherein a surface of said recessed portion, a surface of said complementary protruding portion, or both said surfaces of said female mold half recessed portion and said male mold half protruding portion includes one or more of: a plurality of holes, depressions, and a plurality of projecting crater formations having a hollow interior, the plurality of depressions extending below the surface of the mold half recessed portion or mold half protruding portion, and each projecting crater formation having a raised elongated body portion extending to a height above the surface of the mold half recessed portion or the mold half protruding portion and including the hollow interior.

13. The bagel product mold assembly as claimed in claim 12, further comprising:
an input conduit formed at each said plural male bagel mold half of said second tray, each said input conduits adaptable for supplying a source of boiling liquid water to the space defined between the recessed portion and protruding portion when said halves are engaged; and
an output conduit formed at each said plural female bagel mold half of said first tray and adaptable for draining said boiling liquid water supplied from said defined space.

14. The bagel product mold assembly as claimed in claim 13, wherein said sealed assembly is adapted to be submerged in a cauldron of boiling water, each said input conduit and output conduits in communication with ports at said male and female bagel mold halves for receiving boiling water.

15. A system of making a hollowed bagel product comprising:
a bagel product half mold assembly comprising:
a first tray having a plurality of female bagel mold halves, each of the plurality of female bagel mold halves having a recessed portion therein shaped for receiving a dough material used to make a bagel product, and
a second tray having a plurality of male bagel mold halves, each of the plurality of male bagel mold halves configured for alignment with a corresponding female bagel mold half, the male bagel mold halves each having a protruding portion complementary to a respective recessed portion of said female bagel mold halves and adapted for placement within said recessed portion of a corresponding aligned female bagel mold half such that a space is defined between the surfaces of said recessed portion and protruding portion,
a hopper receiving raw dough material and automatically measuring and obtaining a precise amount of raw dough material product for insertion into each said plurality of female bagel mold halves of said first tray;
a fastener engaging first and second trays to form a sealed mold assembly in which said plurality of male bagel mold halves of said second tray is aligned for sealed engagement with a corresponding female bagel mold half of said first tray, each complementary protruding portion of a corresponding male bagel mold half placed within said recessed portion of said female bagel mold half such that, when engaged, said extruded dough material takes a hollowed shape in said defined space, wherein a surface of said recessed portion, a surface of said protruding portion, or both surfaces of said recessed portion and said protruding portion include one or more of: a plurality of holes, depressions, and a plurality of projecting crater formations having a hollow interior, the plurality of depressions extending below the surface of the mold half recessed portion or mold half protruding portion, and each projecting crater formation having a raised elongated body portion extending to a height above the surface of the mold half recessed portion or the mold half protruding portion and including the hollow interior;
conveyor belt for conveying the engaged, sealed mold assembly to a receptacle of boiling water, said receptacle for receiving the engaged, sealed mold assembly, wherein boiling water of said receptacle is conveyed to said defined space having said hollow shaped dough material shaped therein; and
the conveyor belt for removing the engaged, sealed mold assembly from the receptacle of boiling water for draining the water from the sealed mold assembly, and transferring the boiled hollow shaped dough products in the boiling water to an oven for baking said hollow shaped dough products.

16. The system as claimed in claim 15, wherein said sealed mold assembly is configured to bake said boiled hollow shaped dough material in said oven while engaged within said male mold and female mold halves; and after said baking removing the baked bagel product from said engaged mold halves.

17. The system of making a hollowed bagel product as claimed in claim 15, wherein said fastener comprises:
a mechanical assembly including arms for registering the second tray of said plurality of male bagel mold halves over said first tray of said plurality of female bagel mold halves, lowering said second tray over said first tray for engaged alignment therewith, and imparting a force to sealingly engage the second tray of said plurality of male bagel mold halves with said first tray of said plurality of female bagel mold halves.

18. The system of making a hollowed bagel product as claimed in claim 17, further comprising: a mechanical blade assembly timed to automatically cut the precise amount of raw bagel dough from an extruded portion of dough output from said extruder device for insertion into each said plurality of female bagel mold halves of said first tray.

\* \* \* \* \*